United States Patent [19]

Reilly

[11] Patent Number: 4,673,308

[45] Date of Patent: Jun. 16, 1987

[54] HINGE MECHANISM FOR USE WITH FOLDING STRUCTURES

[75] Inventor: Frederick W. Reilly, Toronto, Canada

[73] Assignee: Miranda Investments Limited, Toronto, Canada

[21] Appl. No.: 865,630

[22] Filed: May 22, 1986

[30] Foreign Application Priority Data

Nov. 29, 1985 [CA] Canada .................................. 496613

[51] Int. Cl.[4] ............................................... F16B 7/00
[52] U.S. Cl. .................................... 403/172; 403/176; 403/295
[58] Field of Search ............... 403/171, 176, 295, 298, 403/172

[56] References Cited

U.S. PATENT DOCUMENTS

| 2,982,379 | 5/1961 | Fisher | 403/171 X |
| 3,272,582 | 9/1966 | Anderson et al. | 403/295 X |
| 3,532,369 | 10/1970 | Reilly | 403/176 |
| 4,111,577 | 9/1978 | Kiyosawa | 403/298 X |
| 4,516,376 | 5/1985 | King | 403/171 X |

FOREIGN PATENT DOCUMENTS

| 8555 | 3/1980 | European Pat. Off. | 403/171 |
| 978821 | 11/1950 | France | 403/298 |
| 2110786 | 6/1983 | United Kingdom | 403/171 |

Primary Examiner—Andrew V. Kundrat
Attorney, Agent, or Firm—Riches, McKenzie & Herbert

[57] ABSTRACT

This invention relates to a folding structure and more particularly, to a novel hinge mechanism for use with a folding structure. The hinge mechanism comprises a corner joint with at least one flange extending therefrom. A pivotal support means is provided with a securing means to secure the corner joint to the support means to provide a pivotal connection thereto. The novel hinge mechanism when used with the folding structure provides a device which is simple to manufacture, easy to use and which requires no special tools or expertise to assemble or disassemble. It can be quickly and easily converted from a folded position to an unfolded position and vice versa.

7 Claims, 14 Drawing Figures

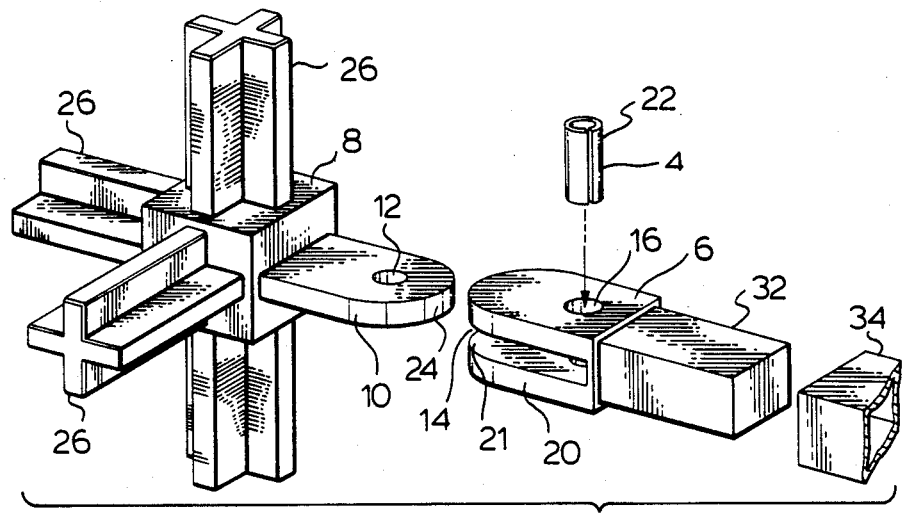
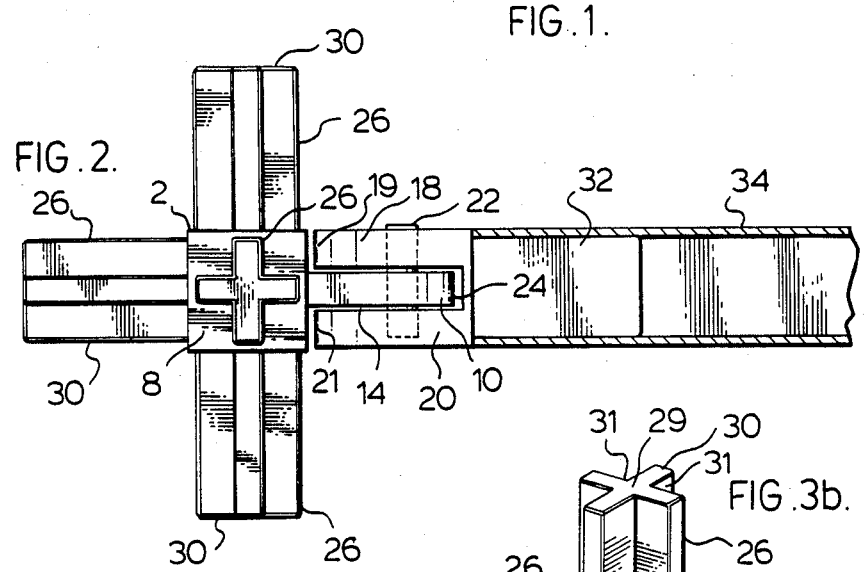
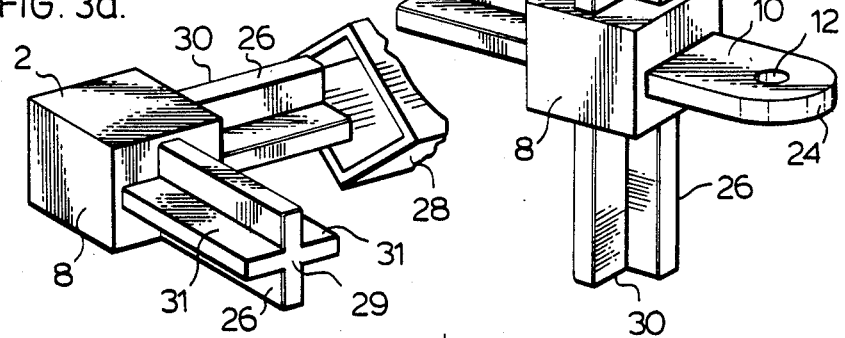

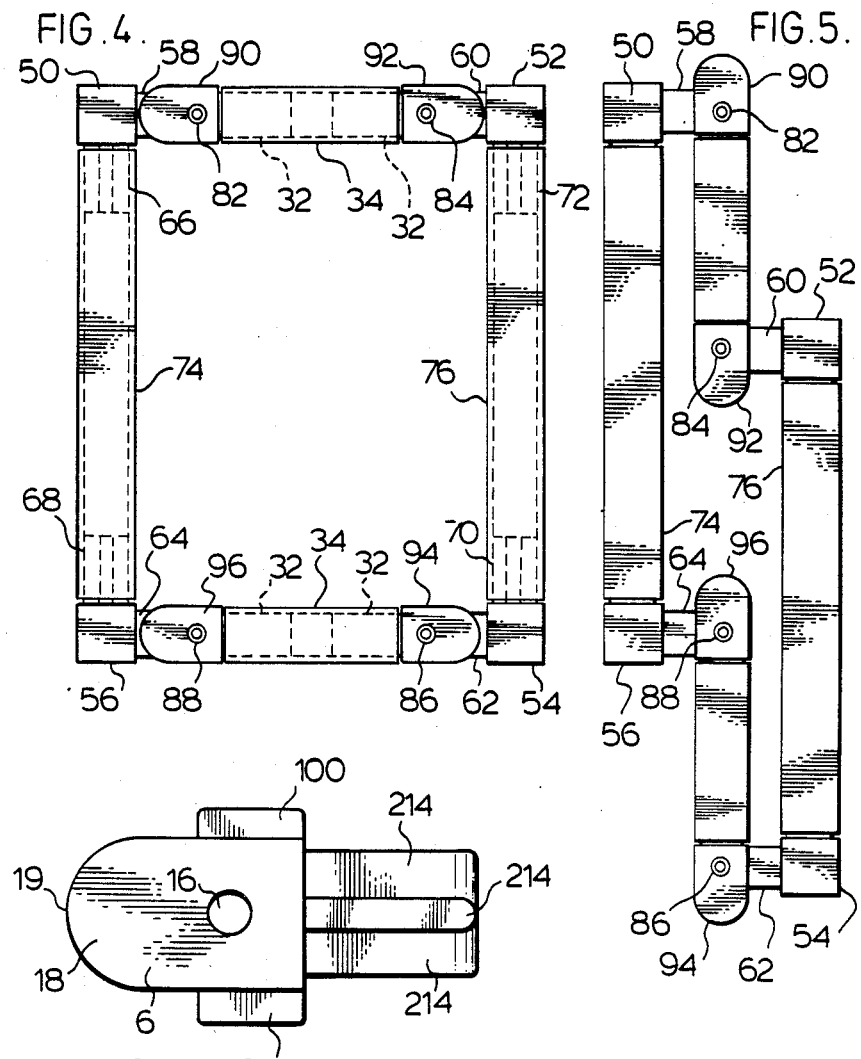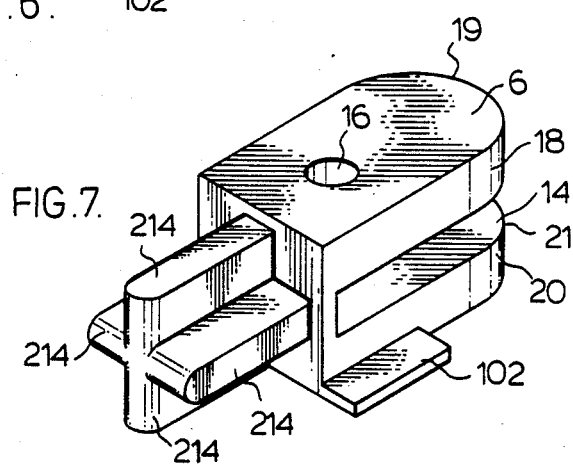

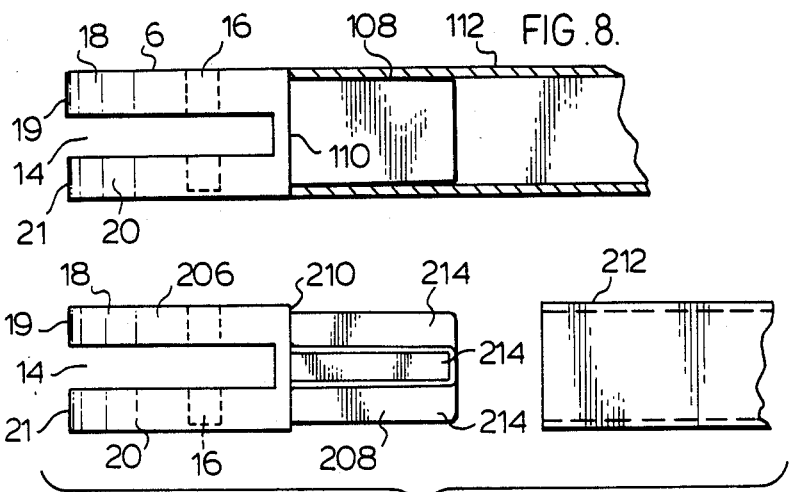
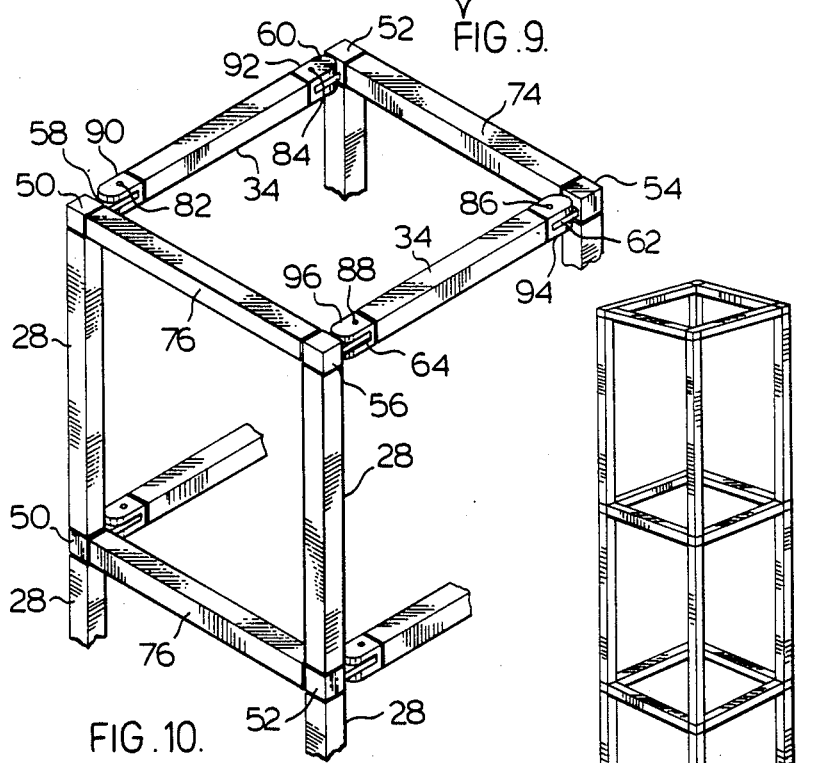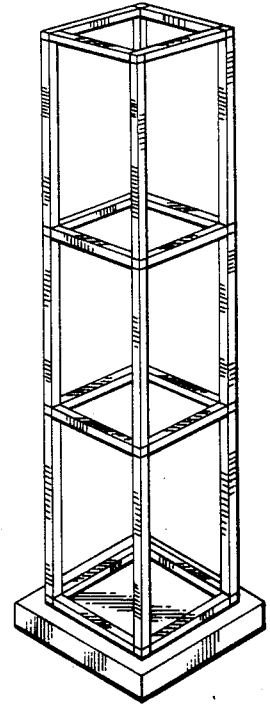
FIG. 8.
FIG. 9.
FIG. 10.
FIG. 11.

HINGE MECHANISM FOR USE WITH FOLDING STRUCTURES

BACKGROUND OF THE INVENTION

1. Field of the Invention

This invention relates generally to folding structures and more particularly to a novel hinge mechanism for use with folding structures.

2. Description of the Prior Art

The present invention relates to a novel hinge mechanism which can be used with a variety of structures wherein it is desired to produce an easily foldable or collapsible structure.

One such structure for which the present invention is most suitable is a display stand which is used to display merchandise. Display stands are widely used in the merchandising field and have wide application for the display and storing of merchandise of all kinds. They may, for example, be found in warehouses to store merchandise, in retail outlets to display goods, and at trade shows, fairs and the like to exhibit the goods of the supplier or manufacturer.

There exists a need for a lightweight, portable and collapsible display stand which can be easily collapsed and transported from one location to another location, in a quick and easy manner without using many tools and a high degree of technical skill of the operator. Canadian Pat. No. 1,183,810 which issued on Mar. 12, 1985 to Miranda Investments Limited provided an improved collapsible display stand which helped to solve this problem. A need has arisen for an even more simpler device which can be used for not only display stands but which can be used in a variety of other applications.

Another example of a folding structure wherein the present invention may be utilized is in office partitions. Many of the offices today use the open floor concept with folding partitions between desks and work stations to separate these from the others in the office and to provide the office workers with some degree of privacy. The present invention is most suitable for use with such office partitions which can be varied to suit the user's needs, in a quick and simple manner.

Other uses for the novel hinge mechanism described hereinafter include any structures which require any angular construction wherein it is desirable to collapse said structure in a simple and efficient manner. Such other uses include by way of illustration, greenhouses, tables, laundry racks, clothes holders.

The prior art devices have been directed to joints or connecting means to connect elements together, of complicated structures which require a number of tools for disassembly or storage.

Examples of such complicated structures include U.S. Pat. No. 2,583,368 (French) 2,868,568 (Frye), 3,563,580 (Blauch), 3,711,133 (Weiner), 3,743,332 (Sonolet), 3,958,889 (Berkowitz), 4,027,982 (Berkowitz), 4,128,353 (Hauterbach) 3,990,195 (Gunther), 3,980,408 (Jackman), 3,901,613 (Anderson) and 3,858,989 (Field).

None of these prior art references disclose a hinge mechanism which can be used with a variety of folding structures which is simple to manufacture, easy to use and requires no special tools or expertise to disassemble or assemble

SUMMARY OF THE INVENTION

Accordingly, it is an objection of the present invention to provide a novel hinge mechanism for a foldable structure which is simple to manufacture, easy to use, and which requires no special tools or expertise to assemble or disassemble.

It is a further object of the present invention to provide a novel collapsible display stand which can be easily assembled or collapsed without the need for special tools.

A further object of the present invention is to provide a novel foldable structure using a new hinge mechanism which can quickly and easily be converted from a folded position to an unfolded position and vise versa.

To this end, in one of its aspects, the invention provides a hinge mechanism for use with a folding structure, which comprises a corner joint with at least one flange extending therefrom, a pivotal support means, and a securing means to pivotally secure said corner joint to said support means.

Further objects and advantages of the invention will appear from the following description taken together with the accompanying drawings.

BRIEF DESCRIPTION OF THE DRAWINGS

FIG. 1 is an exploded view of the components of the novel hinge of the present invention.

FIG. 2 is an assembled view of the components of FIG. 1.

FIG. 3a is a perspective view of one embodiment of the corner joint of the present invention.

FIG. 3b is a perspective view of a second embodiment of the corner joint of the present invention.

FIG. 4 is a top plan view of an assembled display unit using the novel hinge mechanism of the present invention.

FIG. 5 is a top plan view of FIG. 4 in the folded position.

FIG. 6 is a top plan view of one embodiment of the support means of the present invention.

FIG. 7 is a perspective view of FIG. 6.

FIG. 8 is a side elevational view of one embodiment of the support means of the present invention.

FIG. 9 is an exploded view of a second embodiment of the support means of the present invention.

FIG. 10 is a partial perspective view of a display case using the present invention.

FIG. 11 is a perspective view of a display case using the present invention.

DESCRIPTION OF THE PREFERRED EMBODIMENT

Figure 12:
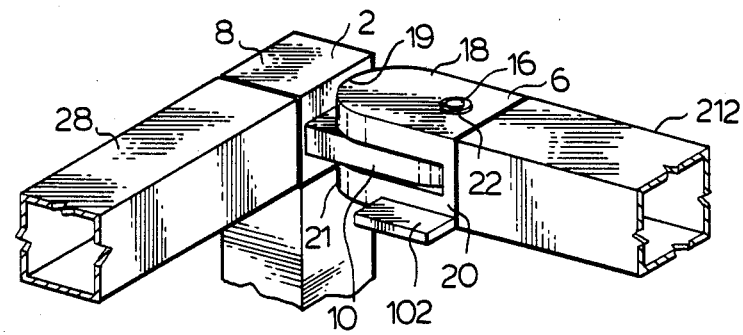
FIG. 12 is a view of a corner of the display case of FIG. 10.

For ease of understanding the present invention, its structure and operation will now be specifically described for use with a collapsible display stand. It is understood that such disclosure is by illustration only and the invention is equally usable for any foldable structure, as will be explained hereinafter.

Referring first to FIG. 1, there is shown in exploded view, the three essential elements of the present invention. The invention consists essentially of a corner joint 2, a pivotal support means 6, and a securing means 4 to secure the corner joint 2 to the pivotal support means 6.

The corner joint 2 may be of a variety of construction, as will be explained hereinafter, depending upon its specific use and location. It consists of a block 8 and at least one flange 10 extending from one surface of the block 8. An aperture 12 is cut through the flange 10. When the hinge mechanism is assembled, flange 10 is inserted into the slot 14 which is formed by arms 18,20 until the aperture 12 is aligned with aperture 16. The split pin 22 is then inserted through the apertures 12,16 to secure the components together as shown in FIG. 2. Since the split pin 22 is machined to fit snugly in apertures 16,12, it secures the flange 10 to the arms 18,20. Since the split pin 22 is marginally compressible, it can be forced into the apertures 12,16 and under slight compression, it applies pressure outwardly to the flange 10 and the arms 18,20 thus providing a tight fit. Also since the outer end 24 of the flange 10 is rounded, it can pivot about the pin 22 without contacting the inner surface of the slot. Also, since the outer ends 19,21 of arms 18,20 are rounded, the pivotal support means 6 can also pivot without the ends 19,21 of the arms 18,20 contacting the adjacent surface of the block 8.

The corner joint 2 may have any desired configuration depending upon its specific location and use. A particularly preferred embodiment is shown in FIG. 3a and 3b wherein the corner joint 2 has a plurality of flat faces from which extend at least one spigot. FIG. 3a shows a corner joint 2 wherein two spigots 26 extend from three faces. FIG. 3b shows a corner joint 2 wherein spigots 26 extend from three faces. FIG. 2 shows a corner joint 2 wherein four spigots 26 extend from four faces.

Each spigot 26 is constructed such that it can fit within a tubular member 28 as shown in FIG. 3a and the number of spigots correspond to the number of tubular members to be joined to the joint 2.

Each spigot 26 is constructed such that it can fit within a tubular member 28 as shown in FIG. 3a and the number of spigots correspond to the number of tubular members to be joined to the joint 2.

In this embodiment, each joint 2 is used for connecting tubular members having an internal square cross-section. The joint 2 has a plurality of spigots 26 which are adapted to be inserted into the tubular members 28. The number of spigots correspond to the number of tubular members to be joined together by one joint 2.

As best seen in FIGS. 3a and 3b each spigot 26 is formed as a solid square 29 with steps 31 in each longitudinal corner thus forming a plurality of ribs 30. The diameter taken across the diametrically opposed ribs is less than the length of the diagonal across the corners of ribs 30 and greater than the distance between diametrically opposite corners of the tubular members by an amount to provide a press fit between the ribs and the inner wall of the tubular member 28. Thus, when the spigot is entered into its respective tubular member 28, and rotated to bring each rib 30 into engagement with its respective wall, the spigot and the tubing are releasably locked together.

FIG. 4 shows a top view of a single arrangement of a folding structure using the present invention. In this arrangement, there are four corner joints 50,52,54,56, each having a flange 58,60,62,64 extending from one surface and a spigot 66,68,70,72 extending from another surface. Spigots 66,68 are locked into tubular member 74 and spigots 70,72 are locked into tubular member 76. Each support means 90,92,94,96 is pivotally connected to the respective flanges 58,60,62,64 by split pins 82,84,86,88. Thus, the two tubular members 74,76 provide a pivot or hinged construction. A shelf or other display device (not shown) is placed over tubular members 74,76 to display merchandise.

When it is desired to fold this structure, the shelf is merely removed and tubular member 74 is swung in either direction as shown in FIG. 5. This structure can be repeated any number of times or in any different configuration thus providing for an infinite number of variations and total flexibility of product design.

In the embodiment shown in FIG. 1 and 2, the end of the support means 6, opposite to the end with the arms 18,20 extends as a tubular member 32 with a corresponding support means 34 on the end of the tubular member 32. With this structure, the length of the tubular member 32 is of a fixed length. It may also be desired to manufacture the support means 6 which may be used with any desired tubular member of differing lengths.

There are several alternative ways to manufacture support means 6 such that the tubular member 32 may be varying lengths. One such structure is shown in FIG. 8. In this embodiment, the pivotal support means 6 includes a short stem 108 extending outwardly from the rear surface 110. Tubular member 112 is then inserted over stem 108 with a press fit such that the stem 108 is locked into tubular member 112. With this arrangement, each support means 6 is identical, and the spacing between the support means can be varied by using tubular members 112 of differing lengths.

A second embodiment is shown in FIG. 9. This embodiment uses the same spigot type arrangement as is used with the corner joint as shown in FIGS. 3(a) and 3b. The support means 206 carries a spigot 208 on end 210 and the spigot 208 is constructed such that it can fit with a tubular member 212. The spigot 208 is formed as a solid square with steps in each longitudinal corner thus forming a plurality of ribs 214. The diameter across the diametrically opposed ribs is less than the length of the diagonal across the corners of the tubular member 212 and greater than the distance between diametrically opposed corners of the tubular member 212 by an amount to provide a press fit between the ribs and the inner walls of the tubular member. Thus, when the spigot is entered into the respective tubular members 212 and rotated to bring each rib 214 into engagement with its respective wall, the spigot and the tubular member are releasably locked together. If desired, a one-piece resilient casing (not shown) can be provided which completely circumferentially encloses each spigot and secured thereto to rotate therewith.

In the assembled construction, there are several different methods for placing the display shelf. As stated hereinbefore, the display shelf may be placed directly on top of the assembly. Alternatively, the pivotal support means 6 may be provided with one or more outwardly extending flanges 100,102 as shown in FIGS. 6 and 7. As shown in FIG. 7, flange 100 extends outwardly from the lower arm 20. With this construction, the display shelf can be easily fit on the top of each of the flanges to provide a recessed display shelf upon which the merchandise can be placed for display.

As stated hereinbefore, the hinge mechanism of the present invention can be used to construct a variety of devices in any infinite number of configurations, thus allowing for individual product design. As shown in FIG. 10 to 14, a display case may be constructed using this invention. FIG. 10 shows a partial perspective view of the assembled display; FIG. 11 shows an example of a complete display; FIG. 12 shows an assembled corner construction; the top view of the folded display case is shown in FIG. 5 and the top plan view is shown in FIG. 4.

Figure 13:
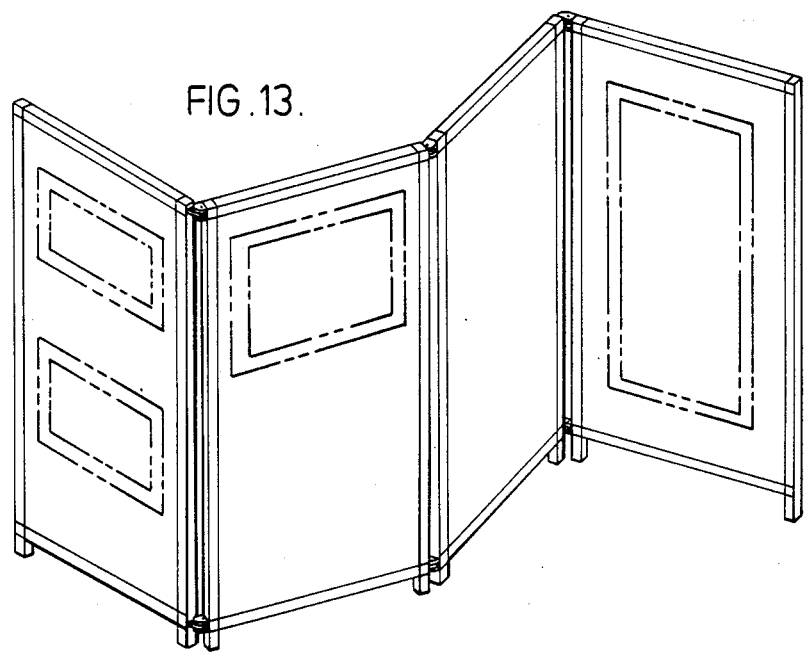
FIG. 13 is a perspective view of an office partition using the present invention.

The present invention may also be used in the construction of partitions used in offices and the like. FIG. 15 shows an assembled wall partition, with each corner as shown in FIG. 13 (with the flanges 100,102 being removed). Thus, it can be seen that the present invention has an infinite number of uses allowing for total freedom of product design.

The components of this invention may be made of any suitable material. It is preferred that they be made of a lightweight and strong material and may be made of ZAMAC 3, a zinc alloy material.

The hinge mechanism may be used to construct any structure which requires an angular configuration and provides a device which can be easily converted from an assembled to a folded position and vice versa without the need for any tools or expertise.

Although the disclosure describes and illustrates a preferred embodiment of the invention, it is to be understood the invention is not restricted to this particular embodiment.

What I claim is:

1. A hinge mechanism for use with a folding structure, which comprises a corner joint with at least one flange extending therefrom, a pivotal support means, and a securing means to pivotal secure said corner joint to said support means, said corner joint consisting of a block and said at least one flange extending from said block, said flange having a rounded outer end and an aperture extending therethrough;

said pivotal support means having a pair of arms for securing said flange therebetween, said pair of arms having an aperture extending therethrough, and said pivotal support means further including at least one flange extending outwardly from the sides of one of said arms, said flanges for supporting a display means; and said securing means consisting of a split pin to fit through the aperture of said flange and through the aperture in said arms to pivotally secure said corner joint to said support means.

2. A hinge mechanism as claimed in claim 1 wherein the outer end of each of said arms is rounded.

3. A hinge mechanism as claimed in claim 2 wherein said split pin is machined to fit snugly within said aperture to provide a pivotal connection between said corner joint and said support means.

4. A hinge mechanism as claimed in claim 3 wherein said corner joint has a plurality of flat surfaces and at least one spigot extending from one of said flat surfaces, each spigot adapted to be inserted into a tubular member, the number of spigots corresponding to the number of tubular members to be joined together by one corner joint, said spigot having a number of longitudinally extending, diametrically opposite ribs corresponding in number to the number of internal flat walls of the tubular members, the diameter tubular across the diametrically opposite ribs being less than the length of the diagonals across the corners of the tubular members and greater than the distance between diametrically opposite walls of the tubular members by an amount to provide a press fit between the ribs and the inner walls of the tubular members whereby when a spigot is entered into its respective tubular members and rotated to bring each rib into engagement with its respective wall, the spigot and the tubular members are releasably locked together.

5. A hinge mechanism as claimed in claim 1 wherein said pivotal support means has a pair of arms having rounded ends extending from an elongated tubular member.

6. A hinge mechanism as claimed in claim 1 wherein said pivotal support means have a pair of arms having rounded ends extending from a rectangular block.

7. A hinge mechanism as claimed in claim 6 wherein said blocks has at least one spigot extending from one of the surfaces, each spigot adapted to be inserted into a tubular member, the number of spigots corresponding to the number of tubular members to be joined together by one corner joint, said spigot having a number of longitudinally extending, diametrically opposite ribs corresponding in number to the number of internal flat walls of the tubular members, the diameter tubular across the diametrically opposite ribs being less than the length of the diagonals across the corners of the tubular members and greater than the distance between diametrically opposite walls of the tubular members by an amount to provide a press fit between the ribs and the inner walls of the tubular members whereby when a spigot is entered into its respective tubular members and rotated to bring each rib into engagement with its respective wall, the spigot and the tubular members are releasably locked together.

* * * * *